United States Patent [19]

Purviance

[11] Patent Number: 4,718,797
[45] Date of Patent: Jan. 12, 1988

[54] SNAP-ON PAD FOR CHUCK KEY

[76] Inventor: John R. Purviance, 29530 Highmeadow Rd., Farmington Hills, Mich. 48024

[21] Appl. No.: 327,841

[22] Filed: Dec. 7, 1981

[51] Int. Cl.[4] .............................................. B23B 31/06
[52] U.S. Cl. .................................... 408/241 R; 81/16; 279/1 K
[58] Field of Search .................. 408/241 R; 279/1 K; 81/90 A, 177 D, 177 ST, 177 R, 16; 16/114 R, DIG. 18, DIG. 19, DIG. 25; 145/61 L, 65, 61 C; 29/453; 403/17; 74/543

[56] References Cited

U.S. PATENT DOCUMENTS

| | | | |
|---|---|---|---|
| 1,647,396 | 11/1927 | Decker | 408/241 R |
| 2,312,150 | 2/1943 | Conner | 74/543 X |
| 2,552,694 | 5/1951 | Stoner | 248/1 |
| 2,592,094 | 4/1952 | Willenbring | 248/1 |
| 2,941,426 | 6/1960 | Muller et al. | 408/241 |
| 3,752,202 | 8/1973 | Condon | 145/61 C |
| 4,032,160 | 6/1977 | Karasa et al. | 279/1 K |
| 4,111,079 | 9/1978 | Derbyshire | 81/90 A |
| 4,123,195 | 10/1978 | Purviance | 408/241 R |
| 4,147,184 | 3/1979 | Jess | 251/312 X |

*Primary Examiner*—Z. R. Bilinsky
*Attorney, Agent, or Firm*—Brooks & Kushman

[57] ABSTRACT

A chuck key pad (10) disclosed has a unitary construction that is snapped onto an associated chuck key to permit application of a greater torque than would otherwise be possible during tightening and loosening of a chuck. The pad (10) includes a body (28) having a central hole (30) that receives the conventinal shaft of the chuck key and also includes spaced retainers (32) that engage the chuck key handle on opposite sides of its shaft upon mounting such that locking portions (34) of the retainers resiliently deflect over the handle with a snap action. In its preferred construction, the pad body (28) includes a central portion (36) defining the shaft hole (30) and also includes a pair of opposite end portions (38) including spaced pairs of the retainers (32). An elongated groove (40) extends through the central portion (36) and the end portions (38) of the pad to receive the key handle. Spaced surfaces (42) of the locking portions (34) converge toward the groove (40) to permit the snap action mounting as pressure is applied between the pad and the key upon mounting. One embodiment of the pad includes generally flat gripping surfaces (44) on the body, while another embodiment includes curved gripping surfaces (46) that define oppositely facing depressions on each side of the key shaft.

6 Claims, 4 Drawing Figures

SNAP-ON PAD FOR CHUCK KEY

TECHNICAL FIELD

This invention relates generally to chuck keys for tightening and loosening chucks that holds drills, blade bits, or any other type of tool.

BACKGROUND ART

Drill chucks are conventionally operated by a chuck key to provide tightening and loosening of jaws of the chuck about an associated drill, blade bit, or any other type of tool that is held by the chuck during use. Conventional chuck keys include a shaft having a gear at one end and a handle that projects in opposite directions from the shaft at its other end. Adjacent its gear, the shaft includes an extreme end portion that is received within a lateral hole in the chuck during use such that the key gear meshes with a ring gear on the chuck to effect jaw movement upon rotation of the key about its shaft. Conventional chuck key handles are in the form of a round rod that extends through a hole in the associated shaft end in order to permit application of torque to the chuck key during tightening and loosening of the chuck.

U.S. Pat. No. 1,647,936 as well as numerous other prior art references disclose the type of chuck key described above.

A greater amount of torque can be easily applied to a chuck key with the type of handle construction disclosed by U.S. Pat. Nos. 2,552,694 and 2,592,094. This handle construction includes a thumb end that is flattened in order to permit the manual application of a greater extent of torque during tightening and loosening of a chuck. Also, another type of handle construction for a chuck key as disclosed by U.S. Pat. No. 4,032,160 includes flattened portions at both of its end in order to permit both the thumb and one finger to engage flat surfaces during the manual application of torque to effect chuck tightening or loosening.

A two-piece chuck key construction is disclosed by U.S. Pat. No. 4,111,079 and includes a geared headed part as well as a handle part that are molded, die cast, or forged. The headed part includes a stem portion that is received within a central opening in the handle part during assembly. The handle part of this chuck key has a somewhat flat construction such that the application of torque thereto would be more easily manually accomplished than with the conventional round rod type of handle construction.

My prior U.S. Pat. No. 4,123,195 discloses a chuck key holder for holding a chuck key in spanning engagement with a chuck during the application of torque upon tightening or loosening the chuck. With this type of chuck key holder, it is possible to apply a greater extent of torque during the tightening and loosening. However, the extent of torque that can be applied during tightening or loosening of the chuck is limited by the force that can be manually applied to the chuck key handle. After tightening and loosening of the chuck key with one hand, release of the holder by the other hand provides automatic ejection of the chuck key from the chuck such that inadvertent rotational operation of the chuck cannot take place with the key still engaged.

DISCLOSURE OF INVENTION

An object of the present invention is to provide an improved pad for mounting on a chuck key in order to permit manual application of a greater amount of torque than would otherwise be possible during tightening or loosening of a chuck. The pad is designed for use with a conventional chuck key of the type including a shaft having a gear at one end thereof and a handle extending in opposite directions from the other end of the shaft.

In carrying out the above object, a chuck key pad constructed in accordance with the present invention comprises a unitary body of a resilient material and is preferably molded from a suitable plastic such as nylon. The unitary body includes a central hole that receives the shaft of the chuck key upon mounting of the pad on the key. The pad body also includes spaced retainers that engage the handle of the chuck key on opposite sides of the shaft as the pad is mounted on the key. Locking portions of the retainers resiliently deflect over the handle of the key upon mounting thereon so as to cooperate with the hole in locating the pad on the key.

In the preferred construction of the pad, the unitary body includes a central portion defining the hole that receives the key shaft and also includes a pair of opposite end portions that define spaced pairs of the retainers. An elongated groove of the pad body extends through the central portion and the end portions thereof so as to receive the handle of the chuck key as the pad is mounted on the key. The locking portions of each pair of spaced retainers include spaced surfaces that converge toward the groove that receives the handle of the key upon mounting.

During mounting of the pad, the converging surfaces of the locking portions on the retainers initially engage the key handle on opposite sides of the shaft so as to resiliently deflect the retainers as pressure is applied between the pad and the key. As the handle is received within the groove, the retainers deflect back to their original positions with a snap action and thereby retain the pad on the key in cooperation with the hole which receives the adjacent end of the key shaft.

One embodiment of the pad has its unitary body provided with generally flat gripping surfaces which preferably taper toward each other in an outward direction away from the central portion thereof toward its end portions. Another embodiment of the pad has its unitary body provided with curved gripping portions that define a pair of oppositely facing depressions on each side of the central hole that receives the key shaft upon mounting of the pad on the key.

The pad has particular utility when utilized with a chuck key in cooperation with a holder of the type disclosed in my aforementioned U.S. Pat. No. 4,123,195. Use of the pad with a chuck key and this holder permits manual application of a much greater extent of torque than would otherwise be possible during tightening or loosening of a chuck.

The objects, features, and advantages of the present invention are readily apparent from the following detailed description of the best modes for carrying out the invention when taken in connection with the accompanying drawings.

BEST MODES FOR CARRYING OUT THE INVENTION

Figure 1:
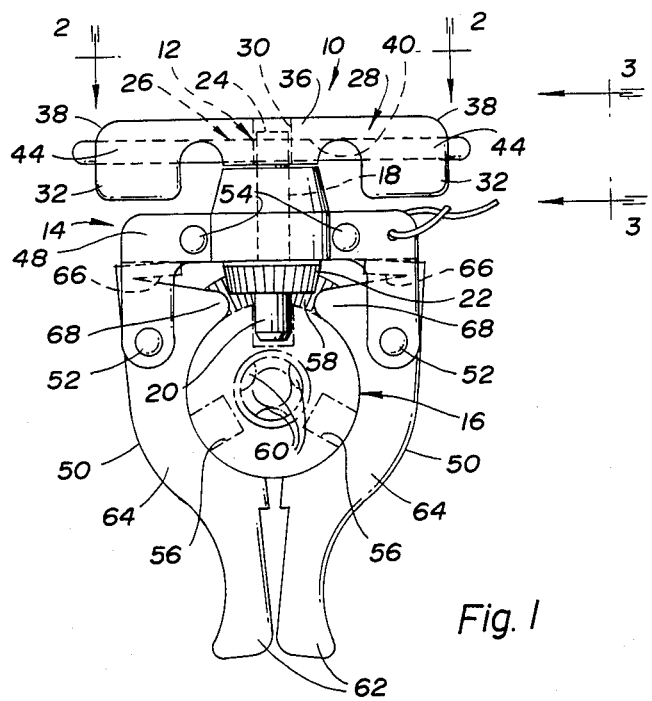
FIG. 1 is a side view of a chuck key pad constructed in accordance with the present invention and shown mounted on a chuck key for use in cooperation with a chuck key holder to provide tightening and loosening of an associated chuck.

Referring to FIG. 1 of the drawings, a chuck key pad constructed in accordance with the present invention is indicated generally by reference numeral 10 and is illustrated mounted on a chuck key 12. A chuck key holder 14 constructed in accordance with my prior U.S. Pat. No. 4,123,195 is illustrated in association with the chuck key 12 in a clamping relationship about a schematically indicated chuck 16 which is operated by the chuck key upon manual rotation. Chuck key 12 is of the conventional type including a shaft 18 having one end 20 including a gear 22. At the other end 24 of the shaft 18, the chuck key 12 includes a handle 26 of a conventional rod construction that projects through a hole in the shaft and extends therefrom in opposite directions. With the pad 10 mounted on the chuck key 12, considerably greater torque can be manually applied to the key for tightening of the chuck 16 since a considerably greater surface area for gripping of the chuck key is provided as compared to the key handle 26 which tends to dig into the operator's hand. The pad 12 has particular utility when utilized with the chuck key holder 14 as will be hereinafter described after an initial description of the pad.

Figure 2:
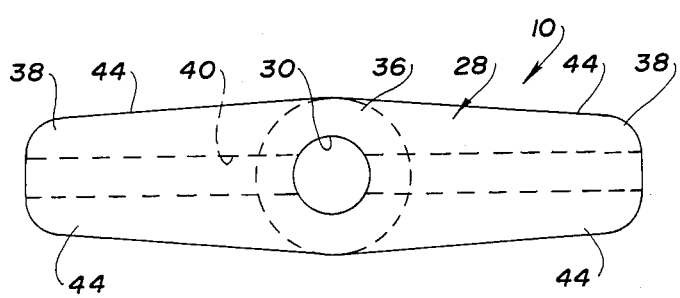
FIG. 2 is a top plan view of the chuck key pad taken along the direction of line 2—2 in FIG. 1.
Figure 3:
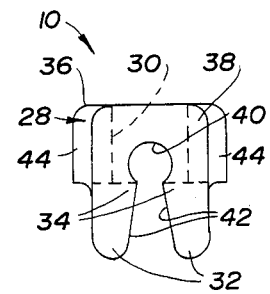
FIG. 3 is an end view of the chuck key pad taken along the direction of line 3—3 in FIG. 1.

With combined reference to FIGS. 1, 2, and 3, the chuck key pad 10 comprises a unitary body 28 of a resilient material and is preferably injection molded from a suitable plastic such as nylon. The pad body 28 includes a central hole 30 of a round shape just slightly larger than the key shaft 18 so as to receive the end 24 thereof upon mounting of the pad on the key 12 as shown in FIG. 1. Pad body 28 also includes spaced retainers 32 that engage the handle 26 of the chuck key 12 on opposite sides of its shaft 18 upon mounting of the pad on the key. As seen in FIG. 3, retainers 32 include locking portions 34 that resiliently deflect over the handle 26 of the key upon mounting thereon so as to cooperate with the shaft hole 30 in locating the pad on the key.

With combined reference to FIGS. 2 and 3, a preferred construction of the unitary pad body 28 has a central portion 36 that defines the shaft hole 30 and also includes a pair of opposite end portions 38 that define spaced pairs of the retainers 32 on each side of the key shaft in the mounted condition. An elongated groove 40 of the unitary pad body 28 extends through the central portion 36 and the end portions 38 thereof so as to receive the handle of the chuck key as the pad is mounted on the key. Groove 40 has a generally round shape that opens in a downward direction, as seen in FIG. 3, to the space between the retainers 32. Preferably, the diameter of the groove 40 is just slightly larger than the diameter of the key handle 26 such that the mounted pad is not in a stressed condition during use.

As seen in FIG. 3, the locking portions 34 of the spaced retainers 32 include spaced surfaces 42 that converge toward the groove 40 which receives the handle of the key upon mounting. As illustrated, the converging surfaces 42 have a generally straight shape although it would also be possible to utilize a generally curved shape. At the lower ends of the retainers 32, the surfaces 42 are spaced from each other a greater distance than the diameter of the chuck key handle 26 with which the pad is to be utilized. Adjacent the opening into the groove 40 between the retainers 32, the surfaces 42 are spaced from each other a slightly lesser distance than the diameter of the groove such that deflection of the locking portions 34 provides a snap action securement upon mounting.

As the pad 10 is mounted on the chuck key 12, the spaced retainers 32 are engaged with the opposite ends of the handle 26 on each side of the key shaft 18 with the pad hole 30 in alignment with the shaft end 24. Pressure applied between the pad 10 and the key 12 then wedges the retainers 32 away from each other until the locking portions 34 have resiliently deflected sufficiently so that the handle is received within the pad groove 40 as the shaft end 24 is concomitantly received within the pad hole 30. Retainers 32 then instantaneously snap back to their original positions such that the locking portions 34 thereof capture the key handle 26 within the pad groove 40 and thereby cooperate with the shaft hole 30 in locating the pad on the key.

As seen in FIG. 2, the unitary body 28 of pad 10 includes generally flat gripping surfaces 44 that enable a greater torque to be manually applied to the associated chuck key than could be applied directly through the handle 26. On each side of its central portion 36, the gripping surfaces 44 preferably taper toward each other in an outward direction toward the end portions 38.

Figure 4:
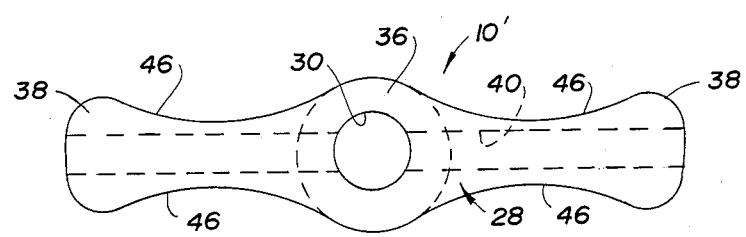
FIG. 4 is a top plan view of another embodiment of the chuck key taken in the same direction as the embodiment shown in FIG. 2.

With reference to FIG. 4, another embodiment of the chuck key pad is indicated generally by reference numeral 10' and, except as will be noted, is the same as the previously described embodiment such that like reference numerals are applied thereto and the previous description is applicable so that no repetition thereof is necessary. However, the key pad 10' includes curved gripping surfaces 46 that define a pair of oppositely facing depressions on each side of the central hole 30 that receives the chuck key shaft upon mounting of the pad on the key. Curved gripping surfaces 46 thus extend between the central portion 36 of the pad body and the end portions 38 thereof to provide a shape that can be conveniently grasped to manually apply torque to the associated chuck key.

As previously mentioned in connection with FIG. 1, the pad 10 has particular utility when utilized with a chuck key holder 14 of the type disclosed by my prior U.S. Pat. No. 4,123,195. This chuck key holder includes a support 48 and a pair of clamp members 50 which are pivoted to the support by spaced pins 52. Support 48 preferably is formed from identical half-sections that are secured to each other by suitable fasteners 54 with the chuck key shaft 18 rotatably supported therebetween such that its gear 22 is positioned between the clamp members 50. Insertion of the key shaft end 20 into one of the chuck holes 56 meshes its gear 22 with a chuck gear ring 58 whose rotation tightens and loosens the jaws 60 of the chuck. Clamp members 50 are moved toward each other as the chuck key is inserted into spanning engagement with the chuck and are held in this position by a pair of handles 62 on the opposite side of the chuck from the inserted key. Clamping portions 64 of the clamp members 50 engage the chuck 16 as the tightening or loosening takes place. This clamping engagement maintains the inserted relationship of the chuck key 12 in spanning engagement with the chuck 16 in order to permit a greater application of torque through the pad 10 as the chuck tightening or loosening is performed.

After tightening or loosening of the chuck 16 using the chuck key holder 14 described above, the handles 62 are manually released whereupon spring portion 66 of the clamp members 50 pivot the clamp members about the pins 52 such that the clamping portions 64 move away from each other and thus unclamp the chuck. As such pivoting takes place, ejecting portions 68 of the clamp members 50 bear against the chuck 16 to force the chuck key 12 out of the inserted relationship with the chuck in order to prevent inadvertent rotation of the chuck with the key still inserted.

While the best modes for carrying out the invention are herein described in detail, those familiar with the art to which this invention relates will recognize various alternative designs and embodiments for practicing the present invention as defined by the following claims.

What is claimed is:

1. A pad for mounting on a chuck key of the type including a shaft having a gear and a handle extending in opposite directions from the shaft to permit manual application of torque for rotating the key about the shaft, said pad comprising: a unitary body of resilient material; said body having an elongated shape that extends transversely to the shaft upon mounting thereon; said body including a central hole that receives the shaft of the chuck key upon mounting thereon; the body also including spaced retainers that engage the handle of the chuck key on opposite sides of the shaft thereof upon mounting thereon; and the retainers including locking portions that resiliently deflect over the handle of the key upon mounting thereon so as to cooperate with the hole in locating the pad on the key.

2. A pad as in claim 1 wherein the unitary body includes a central portion defining the hole and also includes a pair of opposite end portions having spaced pairs of the retainers, and the body including an elongated groove extending through the central portion and the end portions thereof so as to receive the handle of the chuck key as the pad is mounted on the key.

3. A pad as in claim 2 wherein the locking portions of each pair of spaced retainers include spaced surfaces that converge toward the groove that receives the handle of the key upon mounting.

4. A pad as in claims 1, 2, or 3 wherein the unitary body includes generally flat gripping surfaces.

5. A pad as in claims 1, 2, or 3 wherein the unitary body includes curved gripping surfaces that define a pair of oppositely facing depressions on each side of the central hole that receives the chuck key shaft upon mounting of the pad on the key.

6. A pad for mounting on a chuck key of the type including a shaft having a gear and a handle extending in opposite directions from the shaft to permit manual application of torque for rotating the key about the shaft, said paid comprising: a unitary plastic body including a central portion having a central hole that receives the shaft of the chuck key upon mounting thereon; said body having an elongated shape that extends transversely to the shaft upon mounting thereon; the body also including a pair of end portions each of which includes a pair of spaced retainers that engage the handle of the chuck key on one side of the shaft thereof upon mounting thereon; each pair of retainers including locking portions that resiliently deflect over the handle of the key upon mounting thereon so as to cooperate with the hole in locating the pad on the key; and the body including an elongated groove extending through the central portion and the end portions thereof so as to receive the handle of the chuck key as the pad is mounted on the key.

* * * * *